(12) United States Patent
Schierling (10) Patent No.: US 9,859,820 B2
(45) Date of Patent: Jan. 2, 2018

(54) CONVERTER AND METHOD FOR OPERATING SAME

(71) Applicant: Siemens Aktiengesellschaft, München (DE)

(72) Inventor: Hubert Schierling, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/764,495

(22) PCT Filed: Jan. 16, 2014

(86) PCT No.: PCT/EP2014/050781
§ 371 (c)(1),
(2) Date: Jul. 29, 2015

(87) PCT Pub. No.: WO2014/118007
PCT Pub. Date: Aug. 7, 2014

(65) Prior Publication Data
US 2015/0365021 A1    Dec. 17, 2015

(30) Foreign Application Priority Data
Jan. 31, 2013  (EP) .................................... 13153497

(51) Int. Cl.
*H02P 27/04*  (2016.01)
*H02P 3/14*  (2006.01)
(Continued)

(52) U.S. Cl.
CPC ................. *H02P 3/14* (2013.01); *B60L 7/14* (2013.01); *B60L 15/007* (2013.01); *H02J 7/345* (2013.01);
(Continued)

(58) Field of Classification Search
CPC ...... H02M 5/458; H02M 5/271; H02M 1/083; H02M 1/44
(Continued)

(56) References Cited

U.S. PATENT DOCUMENTS

| 5,909,367 A | * | 6/1999 | Change | ................. | H02M 5/271 363/163 |
| 6,031,738 A | * | 2/2000 | Lipo | ..................... | H02M 7/487 363/37 |

(Continued)

FOREIGN PATENT DOCUMENTS

| CN | 1131807 A | 9/1996 |
| CN | 202085130 U | 12/2011 |

(Continued)

OTHER PUBLICATIONS

Lambertz Lukas et al; "Modularer Hochfrequenz Umrichter für Fahrzeugantriebe"; Institut für Leistungselektronik und Steuerungen, Universität der Bundeswehr München; VDE Verlag; EMA Fachtagung 08.—Sep. 9, 2010 in Aschaffenburg; pp. 47-53;ISBN 978-3-8007-3311-8; XP009163159; 2010; DE; Sep. 8, 2010 (2011Q13920).

*Primary Examiner* — Rina Duda
(74) *Attorney, Agent, or Firm* — Henry M. Feiereisen LLC (57) ABSTRACT

A converter having at least one converter module, which includes a primary circuit connected to a power supply, a secondary circuit connected to a load, and a DC link circuit having an intermediate circuit capacitance, is operated according to the disclosed method by controlling the primary circuit such that the intermediate circuit voltage dropping across the intermediate circuit capacitance is adjusted to a predetermined desired voltage value which depends on the direction of the power flow in the secondary circuit.

5 Claims, 3 Drawing Sheets

(51) Int. Cl.
   *H02J 7/34* (2006.01)
   *B60L 7/14* (2006.01)
   *B60L 15/00* (2006.01)
   *H02M 7/493* (2007.01)
   *H02M 7/5387* (2007.01)

(52) U.S. Cl.
   CPC ......... *H02M 7/493* (2013.01); *H02M 7/5387* (2013.01); *B60L 2210/30* (2013.01); *B60L 2210/40* (2013.01); *B60L 2240/527* (2013.01); *B60L 2240/529* (2013.01); *B60L 2240/547* (2013.01); *Y02T 10/645* (2013.01); *Y02T 10/7241* (2013.01)

(58) Field of Classification Search
   USPC .......................................... 318/797, 800, 801
   See application file for complete search history.

(56) References Cited

U.S. PATENT DOCUMENTS

| | | | | |
|---|---|---|---|---|
| 6,052,293 A * | 4/2000 | Ivner | ................... | H02M 5/458 363/36 |
| 6,144,190 A * | 11/2000 | Scott | ................... | H02M 5/4585 322/25 |
| 7,049,786 B1 * | 5/2006 | Toliyat | ................... | H02P 3/18 318/254.1 |
| 7,151,242 B2 * | 12/2006 | Schuler | ................... | F24C 7/087 219/620 |
| 7,324,360 B2 * | 1/2008 | Ritter | ................... | H02M 5/272 363/37 |
| 7,738,267 B1 * | 6/2010 | Tallam | ................... | H02M 1/44 363/35 |
| 7,759,822 B2 * | 7/2010 | Okui | ................... | H02J 7/027 307/66 |
| 7,881,081 B1 * | 2/2011 | Tallam | ................... | H02M 1/44 363/41 |
| 8,188,693 B2 * | 5/2012 | Wei | ................... | H02M 1/083 318/376 |
| 8,259,426 B2 * | 9/2012 | Xiao | ................... | H02M 1/32 361/88 |
| 8,385,091 B2 * | 2/2013 | Nielsen | ................... | H02J 9/062 363/37 |
| 2006/0081616 A1 * | 4/2006 | Schuler | ................... | F24C 7/087 219/625 |
| 2007/0159007 A1 | 7/2007 | Ritchter | | |
| 2010/0109328 A1 * | 5/2010 | Li | ................... | H02M 7/53875 290/44 |
| 2010/0172162 A1 * | 7/2010 | Tallam | ................... | H02M 1/44 363/37 |
| 2010/0264736 A1 * | 10/2010 | Mumtaz | ................... | H02M 7/4807 307/48 |
| 2010/0321965 A1 * | 12/2010 | Sakakibara | ................... | H02M 7/797 363/37 |

FOREIGN PATENT DOCUMENTS

| | | |
|---|---|---|
| DE | 102010008978 A1 | 8/2011 |
| EP | 1883156 A2 | 1/2008 |

* cited by examiner

CONVERTER AND METHOD FOR OPERATING SAME

CROSS-REFERENCES TO RELATED APPLICATIONS

This application is the U.S. National Stage of International Application No. PCT/EP2014/050781, filed Jan. 16, 2014, which designated the United States and has been published as International Publication No. WO 2014/118007 and which claims the priority of European Patent Application, Ser. No. 13153497.6, filed Jan. 31, 2013, pursuant to 35 U.S.C. 119(a)-(d).

BACKGROUND OF THE INVENTION

The invention relates to a converter having at least one converter module, preferably however a plurality of converter modules. The invention furthermore relates to a method for operating such a converter.

Converters are employed in electrical drive engineering in order to supply an electrical load, in particular an electric motor, with electrical power from a (power) network. An example of a field of application for converters here is to supply the drive motor or the drive motors of an electric vehicle. The power supply in question in this case is the battery circuit—carrying DC current—of a traction battery of the vehicle. On the other hand, for stationary applications the primary side of the converter is for the most part connected to a single- or multi-phase AC power supply.

A converter normally comprises a primary circuit to be connected to the network and a secondary circuit to be connected to the load. The primary circuit and the secondary circuit are connected with one another by way of an intermediate (power) circuit, into which an intermediate circuit capacitance is connected. Depending on the type of the network to be connected on the primary side the primary circuit is embodied as a DC chopper controller or power converter (rectifier). The secondary circuit in question is normally an inverter in the form of a single- or multi-phase full bridge circuit.

The physical unit formed from the primary circuit, the secondary circuit and the intermediate circuit (with the intermediate circuit capacitance arranged therein) is also referred to in the following as "converter module". In particular in motor vehicle drive engineering modular converters are employed in which a plurality of such converter modules is connected in series on the primary side. Such a modular converter is known for example from the publication Lukas Lambertz et al. "Modularer Hochfrequenzumrichter für Fahrzeugantriebe", EMA 2010, 08.-09.09.2010, Aschaffenburg ("Modular high-frequency converter for vehicle drives").

Electric motors and other loads supplied by converters frequently have a power factor which significantly undershoots the value One (100%). During the operation of such a load, a periodic reversal of direction of the present power flow regularly occurs in the secondary circuit of the converter module connected to the load. During each period of the output voltage delivered to the load the converter module thereby experiences a single or multiple switch between "power flow as a motor", where electrical power is delivered from the intermediate circuit to the load, and "power flow as a generator", where the load feeds electrical power back into the intermediate circuit.

If the electrical power fed back cannot be delivered, or cannot be delivered quickly enough, to the network it must be stored in the intermediate circuit capacitance. If the intermediate circuit capacitance is not dimensioned as sufficiently high this can lead to an impermissible elevation of the intermediate circuit voltage and thereby to overloading of or even damage to the converter. Generously dimensioned intermediate circuit capacitances do however have an adverse effect on the installation space requirement, the production costs and the weight of the converter.

SUMMARY OF THE INVENTION

The object of the invention is to improve a converter (in particular a modular converter) with regard to the installation space requirement, the production costs and/or the weight without having to accept the risk of overloading the or each converter module.

The invention is based on a converter having at least one converter module. The or each converter module in this case comprises a primary circuit to be connected to a power supply and a secondary circuit to be connected to a load. The or each converter module furthermore comprises an intermediate (power) circuit which is intermediately connected to the primary circuit and the secondary circuit, and into which an intermediate circuit capacitance in the form of a capacitor or a plurality of capacitors is connected.

The converter according to the invention is intended in particular for use in the vehicle drive system of an electric vehicle. The primary circuit is therefore preferably intended to be connected to the battery circuit of a traction battery of the vehicle as a power supply. Accordingly, the primary circuit in question is preferably a DC chopper controller. The load in question to be connected to the converter module on the secondary side is preferably an electric motor or a phase winding of such an electric motor. Accordingly, the secondary circuit is preferably embodied as a single- or multi-phase full bridge circuit.

The method according to the invention can however also be employed in the case of converters for other fields of application, in particular converters whose primary side is embodied to be connected to a three-phase supply network.

In a specific application the method according to the invention is employed in the case of converters whose primary circuit is designed as a single-quadrant chopper and is thereby able to support only one power flow direction. In a further application the method according to the invention is employed in the case of converters whose primary side is in fact designed as being basically capable of energy recovery, but where the or each primary circuit cannot be adapted sufficiently quickly to a momentary reversal of the power flow direction. The method is however not restricted to said cases of application.

In the course of the method, for the or each converter module the intermediate circuit voltage dropping across the intermediate circuit capacitance is regulated to a predetermined desired voltage value by controlling the primary circuit. According to the invention, said desired voltage value is not fixedly predetermined in this situation but is varied depending on the direction of the power flow in the secondary circuit.

The variable control of the desired voltage value and thus of the intermediate circuit voltage makes it possible to prepare the intermediate circuit capacitance for an expected reversal of the power flow direction, which means that the storage capacity of the capacitor can be particularly well utilized. In particular, the intermediate circuit capacitance is discharged in this situation by lowering of the intermediate circuit voltage before it must accept recovered power. In addition or alternatively, the intermediate circuit capacitance is charged by increasing the intermediate circuit voltage before it must deliver power to the load. This means that the intermediate circuit capacitance can be designed as being particularly small without having to accept the risk of overloading the converter module as a result of voltage peaks in the intermediate circuit.

In an advantageous embodiment of the method, in the case of a power flow predominantly as a motor—in other words in an operating mode of the converter in which on average over time more power is delivered to the load than is recovered from the load—the desired voltage value is reduced in advance at the beginning of a power flow phase as a generator. This serves to ensure that the intermediate circuit capacitance is at least partially discharged at the beginning of the power flow phase as a generator and is able to accept the delivered power without an impermissible change in voltage. In this situation the desired voltage value is preferably adjusted to the time-dependent absolute value of the output voltage set by the secondary-side power converter. The desired voltage value is therefore adapted to the timing characteristic of the rectified output voltage—expediently plus a predetermined safety margin (voltage offset).

Alternatively, the desired voltage value is reduced with a sufficient time interval from the start of the power flow phase as a generator to a value which is calculated on the basis of the reactive power of the load and the capacitance value of the intermediate circuit capacitance in such a manner that the intermediate circuit voltage just does not exceed a permissible maximum value for the intermediate circuit voltage during the power flow phase as a generator.

In the case of a power flow predominantly as a generator—in other words in an operating mode of the converter in which on average over time more power is fed in by the load than is delivered from the intermediate circuit to the load—the desired voltage value is raised exactly or at least approximately to a permissible maximum value for the intermediate circuit voltage. This serves to ensure that the load can be adequately supplied with power from the totally or at least almost completely charged intermediate circuit capacitance in short-duration power flow phases as a motor.

The converter in question is preferably a modular converter which comprises a plurality of converter modules of the type described above. When the method according to the invention is applied to such a converter, a module-specific desired voltage value is expediently determined on an individual basis in accordance with the method described above for each of the plurality of converter modules. The intermediate circuit voltage is therefore basically regulated individually in each converter module, in which case the respective desired voltage value is varied depending on the power flow direction in the respective converter module.

In an advantageous development of said method the desired voltage values determined for the individual converter modules are additionally modified on the basis of a common correction term. In this situation said correction term is determined in such a manner that the total power of all the converter modules is regulated to a predetermined desired total power value. In this situation the total power is in particular related to the input power of the converter modules. The concept 'total power' thus denotes in particular the electrical power which is exchanged in total between the converter modules on the one hand and the network on the other hand. By this means the power drawn from the network by the converter or recovered into the network is kept largely constant and a high grid compatibility of the converter is consequently achieved.

In an expedient embodiment the converter according to the invention performs the method described above automatically. To this end it comprises a control device which is configured in respect of circuitry and/or programming technology in order to perform the method according to the invention in one of the embodiment variants described above. In this situation the control device in particular comprises a microcontroller in which a control program (firmware) automatically performing the method during operation of the converter is implemented in executable form. Alternatively or additionally, the control device can comprise at least one non-programmable hardware circuit (for example an ASIC) in which the function for performing the method or a part thereof is implemented by means of circuitry.

If the converter has a plurality of converter modules, the control device is configured in particular in this case in order to individually determine for each converter module the module-specific desired voltage value and—optionally—additionally to modify the module-specific desired voltage values on the basis of the common correction term in order to regulate the total power to the predetermined desired total power value.

Also in the case of a plurality of converter modules the control device can be formed in the context of the invention by a single control unit controlling all the converter modules, for example by a single microcontroller. Alternatively or additionally, to this end in the context of the invention the control device can however also be structured decentrally in its entirety or in part, in that each converter module is (at least also) assigned a separate control unit.

BREIF DESCRIPTION OF THE DRAWING

Exemplary embodiments of the invention will be described in detail in the following with reference to a drawing. In the drawings.

DETAILED DESCRIPTION OF PREFERRED EMBODIMENTS

Parts and variables corresponding to one another are always provided with the same reference characters in all the figures.

Figure 1:
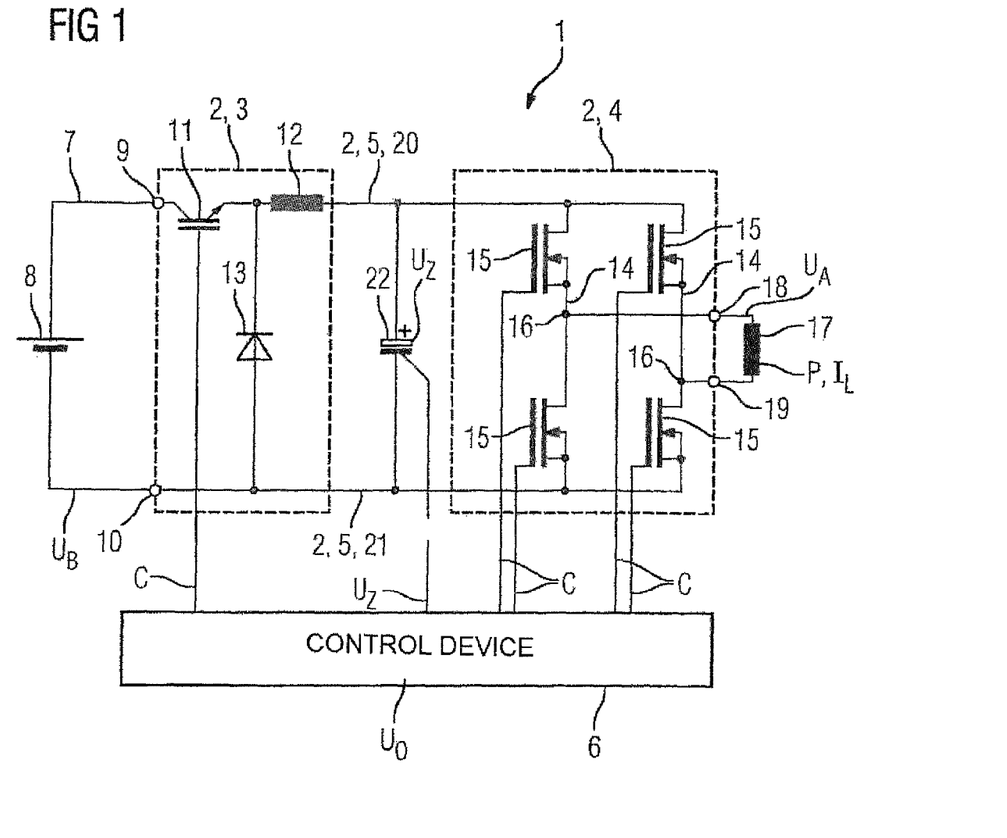
FIG. 1 shows in a schematically simplified circuit diagram a converter having a converter module which comprises a primary circuit to be connected to a power supply, a secondary circuit to be connected to a load, an intermediately connected DC link circuit and a control device, wherein the primary circuit is formed by a single-quadrant chopper (buck converter)

FIG. 1 shows a converter 1 having a single (converter) module 2, which is formed by a primary circuit 3, a secondary circuit 4 and an intermediate circuit 5. The converter 1 furthermore comprises a control device 6.

The primary circuit 3 is designed to be connected on the input side to a (power) network 7 which in the example illustrated is a DC power supply fed by a battery 8, and by way of which a battery voltage $U_B$ is delivered to the primary circuit 3 by way of input terminals 9 and 10.

Accordingly the primary circuit 3 is embodied as a DC chopper controller. Specifically, the primary circuit 3 in question in the exemplary embodiment according to FIG. 1 is a single-quadrant chopper in the form of a simple buck converter. In this case the primary circuit 3 is essentially formed by a semiconductor switch 11 (which is implemented here as an IGBT) connected by way of the input terminal 9 to the positive pole of the battery 8 and by an inductance 12 connected in series therewith. The primary circuit 3 furthermore comprises a diode 13 which is connected in the blocking direction between the emitter of the semiconductor switch 11 and the input terminal 10 connected to the negative pole of the battery 8.

The secondary circuit 4 is formed by a single-phase full bridge circuit (H bridge). In a known manner this consists of two half bridges 14 connected in parallel. Each half bridge 14 comprises two semiconductor switches 15 (here in the form of MOS-FETs) connected in series. In this context, a center tap 16 arranged within each half bridge 14 between the semiconductor switches 15 therein is in each case connected to an output terminal 18 or 19 of the secondary circuit 4 in order to connect a (here single-phase) load 17, and delivers an output voltage $U_A$ to the load 17 during operation. As a deviation from the illustration according to FIG. 1, the secondary circuit 4 can also—in order to supply a multi-phase (in particular three-phase) load—be formed by a multi-phase full bridge circuit.

The primary circuit 3 and the secondary circuit 4 are connected to one another by the intermediate circuit 5. To this end, the intermediate circuit 5 comprises a positive bar 20 and a negative bar 21, between which is connected an (intermediate circuit) capacitance 22 in the form of one or more capacitors. The voltage dropping across the capacitance 22 is referred to as the intermediate circuit voltage $U_Z$.

In the example illustrated the control device 6 is formed by a microcontroller, in which a control program for automatic operation of the converter 1 is implemented using software technology.

The converter 1 is provided in particular in the context of a drive system for an electric vehicle (electric car). The battery 8 in question is therefore in particular the drive battery (traction battery) of the vehicle. Accordingly, the load 17 in question is in particular the electrical drive motor of the vehicle or a phase winding thereof.

The semiconductor switch 11 of the primary circuit 3 and also the semiconductor switch 15 of the secondary circuit 4 are controlled by the control device 6 during execution of the control program. To this end, the gate terminals of the semiconductor switches 11 and 15 are connected to the control device 6 in order to deliver switching signals C. A measurement value from the intermediate circuit voltage $U_Z$ is furthermore fed to the control device 6.

During operation of the converter 1, by means of appropriately pulse width modulated (and thus clocked) control of the semiconductor switches 15 the control device 6 generates the output voltage $U_A$ as an AC voltage having a sinusoidal dependence on the time t. The timing characteristic of the output voltage $U_A$ is shown by a solid line in the lower diagram of FIG. 2.

Figure 2:
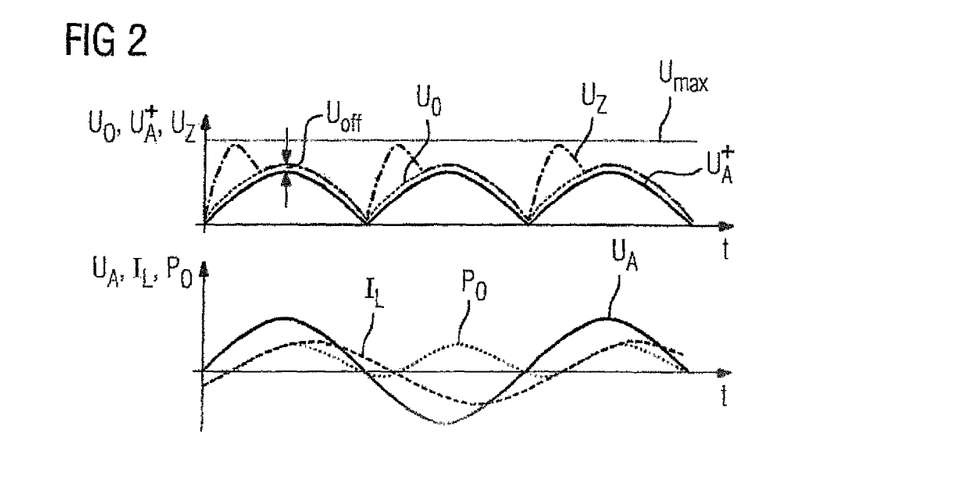
FIG. 2 shows in two synchronous diagrams arranged above one another for an operating mode of the converter predominantly as a motor according to FIG. 1 an exemplary characteristic of an output voltage output from the secondary circuit to the load, of a load current flowing through the load and of the electrical output power flowing through the secondary circuit (lower diagram) and also the characteristic of the absolute value of the output voltage, of a desired voltage value for the regulation of an intermediate circuit voltage and also of the intermediate circuit voltage (upper diagram)

The output voltage $U_A$ generates a load current $I_L$ flowing through the load 17, the sinusoidal characteristic of which is likewise shown in the lower diagram of FIG. 2, by a dashed line. On account of the inductive nature of the load 17, the load current $I_L$ lags behind the output voltage $U_A$. This results in an oscillating—at double the frequency compared with the output voltage $U_A$—characteristic of the (output) power $P_O$ delivered by the secondary circuit 4 to the load 17 (cf. dotted line in the lower diagram of FIG. 2), which is given by the product of the instantaneous values of the output voltage $U_A$ and of the load current $I_L$:

$$P_O(t)=U_A(t) \cdot I_L(t)$$

As can be seen from FIG. 2, the power $P_O$ changes sign four times during each period of the output voltage $U_A$. In this case the absolute value of the power $P_O$ is predominantly positive. This corresponds to a power flow as a motor wherein electrical power is delivered by the secondary circuit 4 to the load 17. Said power flow phases as a motor are however interrupted by short-duration power flow phases as a generator in which the absolute value of the power $P_O$ is negative and in which electrical power is thereby recovered by the load 17 into the intermediate circuit 5.

The semiconductor switch 11 of the primary circuit 3 is likewise controlled in pulse width modulated (and thus clocked) fashion by the control device 6 such that the intermediate circuit voltage $U_Z$ dropping across the capacitance 22 is regulated to a desired voltage value $U_O$.

In its capacity as a single-quadrant chopper, in the case of the exemplary embodiment according to FIG. 1 the primary circuit 3 can however only transport electrical power from the network 7 into the intermediate circuit 5, but not in the reverse direction. The power $P_O$ recovered by the load 17 in the power flow phases as a generator into the intermediate circuit 5 must therefore be taken up by the capacitance 22. As a result, the intermediate circuit voltage $U_Z$ temporarily rises rapidly during the power flow phases as a generator.

In order to prevent—in the case of a comparatively small design (in other words a comparatively low storage capacity) of the capacitance 22—the intermediate circuit voltage $U_Z$ from exceeding a permissible maximum value $U_{max}$ (FIG. 2) for the operation of the converter 1, the desired voltage value $U_O$ is now reduced in advance in each case by the control unit 6 prior to the beginning of each power flow phase as a generator, as a result of which the intermediate circuit voltage $U_Z$ is also reduced. This means that the capacitance 22 will be largely discharged by the beginning of the power flow phase as a generator. The storage capacity of the capacitance 22 is thus available almost in its entirety for accepting the power $P_O$ recovered from the load 17 during the power flow phase as a generator, which in turn means that the rise in the intermediate circuit voltage $U_Z$ during the power flow phase as a generator is minimized.

In a preferred embodiment of the method performed by the control device 6 the desired voltage value $U_O$ is adjusted to the characteristic of the absolute value $U_A^+$ (where $U_A^+=|U_A|$) of the output voltage $U_A$ plus a predetermined safety margin (referred to in the following as offset voltage $U_{off}$):

$$U_O(t)=U_A^+(t)+U_{off}$$

In the upper diagram of FIG. 2 the characteristic of the desired voltage value $U_O$—inasmuch as this does not coincide with the characteristic of the intermediate circuit voltage $U_Z$—is shown by a dotted line. For comparison purposes, in the upper diagram of FIG. 2 the absolute value $U_A^+$ of the output voltage $U_A$ is shown by a solid line.

It can be seen from FIG. 2 that the intermediate circuit voltage $U_Z$—shown in the upper diagram of FIG. 2 by a dot and dash line—predominantly follows the characteristic of the desired voltage value $U_O$ in consequence of the regulation. A temporary elevation of the intermediate circuit voltage $U_Z$ compared with the desired voltage value $U_O$ occurs only in the temporal context of the power flow phases as a generator. In this case however the value of the intermediate circuit voltage $U_Z$ always remains beneath the maximum value $U_{max}$ in consequence of the previous discharge of the capacitance 22.

Figure 3:
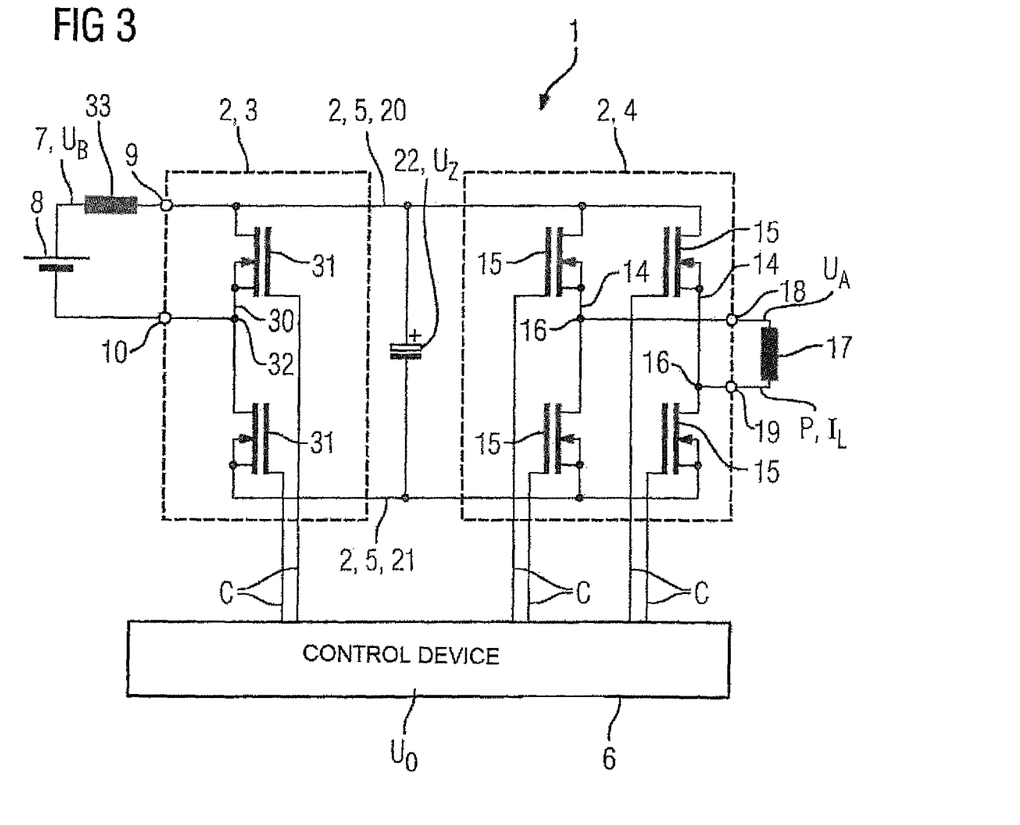
FIG. 3 shows in an illustration according to FIG. 1 an alternative embodiment of the converter wherein the primary circuit is formed by a two-quadrant chopper.

FIG. 3 shows a further embodiment of the converter 1. Said embodiment differs from the embodiment illustrated in FIG. 1 in that the primary circuit 3 of the again single converter module 2 is embodied as a two-quadrant chopper. Instead of the semiconductor switch 11, the inductance 12 and the diode 13 of the exemplary embodiment according to FIG. 1, the primary circuit 3 according to FIG. 3 comprises a half bridge 30 having two semiconductor switches 31 which are connected in series with one another between the positive bar 20 and the negative bar 21 of the intermediate circuit 5. In this case the input terminal 9 is connected directly to the positive bar 20 of the intermediate circuit 5. The input terminal 10 on the other hand is connected to a center tap 32 between the semiconductor switches 31 of the half bridge 30.

In the embodiment according to FIG. 3 the primary circuit 3 is operated as a boost converter. To this end the primary circuit 3 functions together with an inductance 33 connected upstream of the input terminal 9 in the network 7 (which inductance 33, differing from the illustration according to FIG. 3, can however also be integrated into the primary circuit 3).

In contrast to the primary circuit 3 according to FIG. 1, the primary circuit 3 in the exemplary embodiment according to FIG. 3 is suitable both for receiving power from the network 7 and also for recovering power into the network 7. In the exemplary embodiment according to FIG. 3 the converter 1 can therefore be driven not only in an operating mode predominantly as a motor but also in an operating mode predominantly as a generator. In this situation the operating mode of the converter 1 predominantly as a generator is characterized in that the module 2 is fed more output power $P_O$ by the load 17 over a plurality of periods of the output voltage $U_A$ than is delivered to said load 17. In this situation, at least a part of said received output power $P_O$ is recovered by the converter 1 into the network 7.

Such phases of operation predominantly as a generator occur in the case of a drive system for an electric vehicle for example in the situation when the drive motor is employed in order to brake the vehicle. The kinetic energy of the vehicle is recuperated in this case at least partially into electrical energy.

Depending on whether the converter 1 in the exemplary embodiment according to FIG. 3 is operated predominantly as a motor or predominantly as a generator, on execution of the control program implemented therein the control device 6 switches between two different control modes. The control mode employed in operation of the converter 1 predominantly as a motor is the same in this case as the method described with reference to FIG. 2.

The control mode employed by the control device 6 in operation of the converter 1 predominantly as a generator on the other hand is illustrated in detail with reference to FIG. 4. As can be seen from FIG. 4, in this case the control device 6 sets the desired voltage value $U_O$ constantly to a value which essentially corresponds to the permissible maximum value $U_{max}$, but preferably slightly (for example by a maximum 5%) undershoots the latter.

Figure 4:
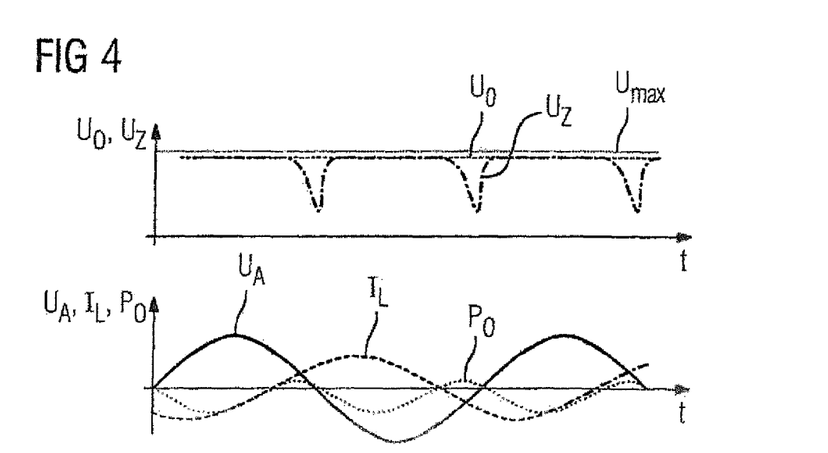
FIG. 4 shows in an illustration according to FIG. 2 for an operating mode of the converter predominantly as a generator according to FIG. 3 the timing characteristic of the output voltage, of the load current and of the output power (lower diagram) and also of the desired voltage value and of the intermediate circuit voltage (upper diagram)

As can be seen from FIG. 4, in consequence of the regulation the intermediate circuit voltage $U_Z$ again largely follows the desired voltage value $U_O$ and thus assumes a value essentially corresponding to the maximum value $U_{max}$, which means that the capacitance 22 is brought into a full-charge state. Temporary drops in the intermediate circuit voltage $U_Z$ (and thus considerable deviations of the intermediate circuit voltage $U_Z$ compared with the desired voltage value $U_O$) occur only during short-duration power flow phases as a motor. The power flow directed towards the load 17 in said phases can in this case be made available exclusively from the capacitance 22, which means that no reversal of the power flow is required in the primary circuit 3.

Figure 5:
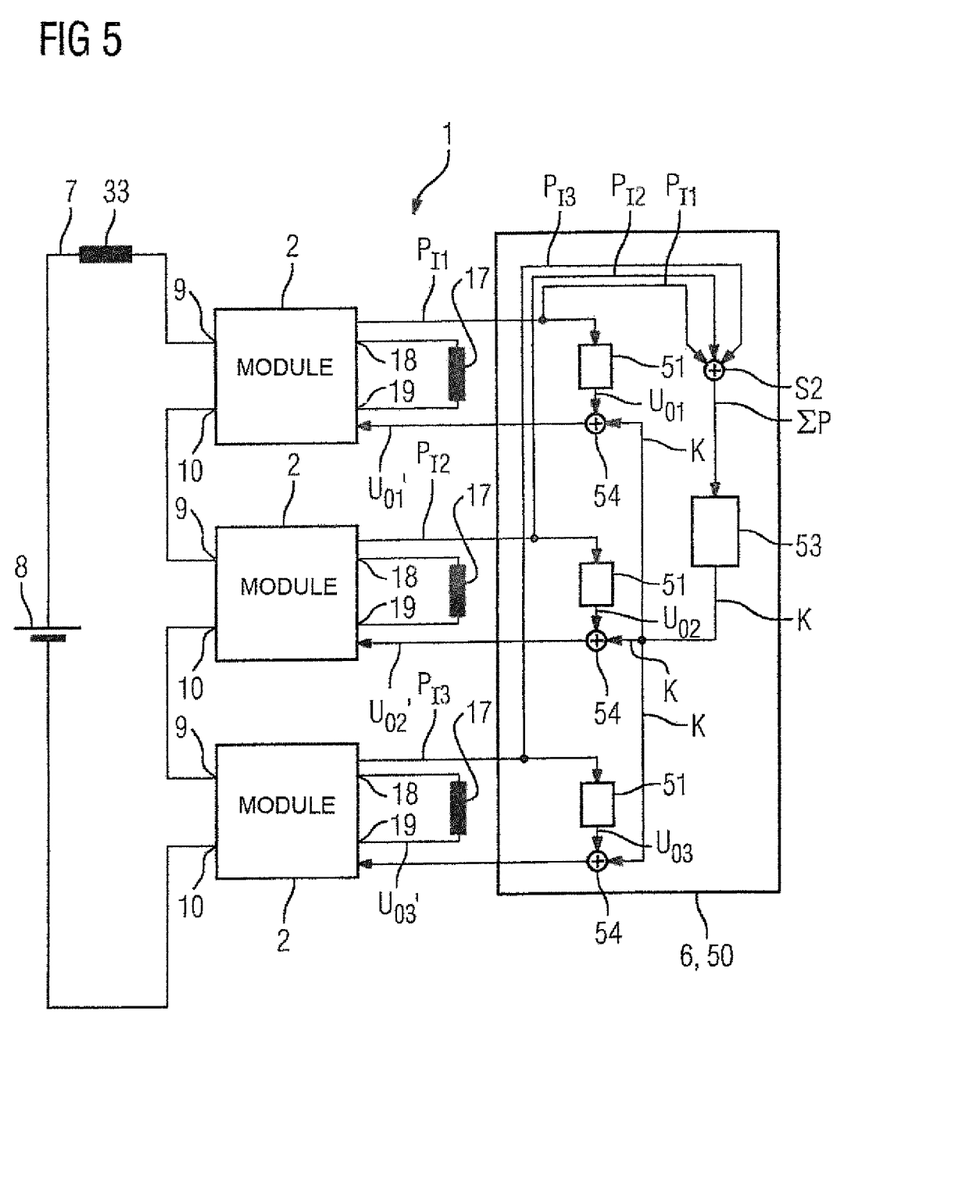
FIG. 5 shows in an illustration according to FIG. 1 a further embodiment of the converter having a plurality of converter modules according to FIG. 3.

Finally, a third embodiment of the converter 1 is shown in FIG. 5. In this embodiment the converter 1 comprises three converter modules 2 which are connected in series into the network 7 on the primary side. In this case, each module 2 corresponds to the module 2 of the converter according to FIG. 3 in respect of its internal structure.

A phase winding of a three-phase electric motor is preferably connected in each case as a load 17 to each of the three modules 2.

In the embodiment according to FIG. 5, the converter 1 includes as part of the control device 6 a central control unit 50 which carries out cross-module control processes. The central control unit 50 is preferably formed by a microcontroller having a control program implemented therein using software technology. In addition, each module 2 comprises a module-internal control unit (not illustrated explicitly) which performs the actual regulation of the respective intermediate circuit voltage $U_Z$.

In the case of the converter 1 according to FIG. 5 the control method described in conjunction with FIG. 3 and FIG. 4 is performed individually for each module 2. In this situation, for each module 2 the actual value of the respective (input) power $P_{I1}$, $P_{I2}$ or $P_{I3}$ is delivered to the central control unit 50 and here in each case to a module-specific voltage controller 51 which, depending on the respective power $P_{I1}$, $P_{I2}$ or $P_{I3}$, determines a module-specific desired voltage value $U_{O1}$, $U_{O2}$ or $U_{O3}$ for the respective associated module 2. The input powers $P_{I1}$, $P_{I2}$, $P_{I3}$ are in this case calculated by the respective submodule 2 (or alternatively by the central control unit 50) in each case from the current strength of the current flowing in the power supply 7, from the intermediate circuit voltage $U_Z$ of the respective module 2 and also from the control factor of the semiconductor switch 31 of the primary circuit 3 of the respective module 2.

Parallel to this, the module-specific powers $P_{I1}$, $P_{I2}$, $P_{I3}$ are delivered to an adder element 52 of the central control unit 50 which calculates a total power $\Sigma P$ therefrom in accordance with $$(P=P_I1+P_I2+P_I3$$

The total power ΣP is compared with a predetermined desired aggregate power value in an (aggregate power) regulator 53 connected downstream. On the basis of the resulting aggregate power difference, said regulator 53 determines a correction term K for the common correction of all the module-specific desired voltage values $U_{O1}$, $U_{O2}$ and $U_{O3}$. Here the correction term K is added in three adder elements 54, each assigned to one module 2, in each case to the desired voltage value $U_{O1}$, $U_{O2}$ $^{or}$ $U_{O3}$ associated with said module 2. A modified desired voltage value $U_{O1}'$, $U_{O2}'$ or $U_{O3}'$ resulting in each case from said addition is fed back to the respective module 2 in order to regulate the module-specific intermediate circuit voltage $U_Z$.

In this situation the correction term K is determined by the aggregate power regulator 53 in such a manner that the (input) power drawn in total by the modules 2 from the network 7 is adjusted to the desired aggregate power value. When the desired aggregate power value is constant, the control device 6 thereby serves to ensure that the modules 2 in total demonstrate an essentially constant power draw.

The components of the control device 6 illustrated in FIG. 5, in other words the voltage controllers 51, adder elements 52 and 54, and the aggregate power regulator 53, are preferably implemented using software technology. The converter 1 shown in FIG. 5 and the associated regulation method can be readily expanded in the context of the invention to any desired number of modules 2.

Furthermore, the scope of the invention is not restricted to the exemplary embodiments illustrated. Rather, further exemplary embodiments of the invention can be derived by the person skilled in the art from the above description. In particular, the individual features described with reference to the exemplary embodiments can also be combined in another manner without departing from the subject matter of the invention. Individual features of the exemplary embodiments can furthermore be omitted or added to.

What is claimed is:

1. A method for operating a converter having at least one converter module, with the at least one converter module comprising a primary circuit configured to be connected to a power supply, a secondary circuit configured to be connected to a load, a DC link circuit connected between the primary and the secondary circuits, and an intermediate circuit capacitance connected to the DC link circuit, the method comprising:
   controlling the primary circuit such that an intermediate circuit voltage dropping across the intermediate circuit capacitance has a predetermined desired voltage value, wherein the predetermined desired voltage value is variable depending on a direction of a power flow in the secondary circuit,
   wherein, when the power flow in the secondary circuit corresponds substantially to a motor operation of the load, the predetermined desired voltage value is reduced in advance of a power flow in the secondary circuit that corresponds to a generator operation of the load,
   wherein, when the power flow in the secondary circuit corresponds substantially to a generator operation of the load, the predetermined desired voltage value is increased so as to exactly or at least approximately correspond to a permissible maximum value for the intermediate circuit voltage, and
   wherein the desired voltage value is modified based on a common correction term such that a total power of the converter module is controlled to a predetermined desired total power value, and
   wherein the predetermined desired voltage value is adjusted so as to track a time-dependent absolute value of an output voltage set by the secondary circuit.

2. The method of claim 1, wherein the predetermined desired voltage value is reduced to a maximum value, which is calculated based on a reactive power of the load and a capacitance value of the intermediate circuit capacitance, such that the intermediate circuit voltage does not exceed the permissible maximum value for the intermediate circuit voltage for the power flow in generator operation of the load.

3. A method for operating a converter having a plurality of converter modules, with each of the converter modules comprising a primary circuit configured to be connected to a power supply, a secondary circuit configured to be connected to a load, a DC link circuit connected between the primary and the secondary circuits, and an intermediate circuit capacitance connected to the DC link circuit, and wherein a separate module-specific desired voltage value is set individually for each of the converter modules by:
   controlling the respective primary circuit such that an intermediate circuit voltage dropping across the intermediate circuit capacitance has the predetermined desired module-specific voltage value, wherein the predetermined desired module-specific voltage value is variable depending on a direction of a power flow in the respective secondary circuit,
   wherein, when the power flow in the respective secondary circuit corresponds substantially to a motor operation of the load, the predetermined desired voltage value is reduced in advance of a power flow in the secondary circuit that corresponds to a generator operation of the load, or
   wherein, when the power flow in the respective secondary circuit corresponds substantially to a generator operation of the load, the predetermined desired voltage value is increased so as to exactly or at least approximately correspond to a permissible maximum value for the intermediate circuit voltage, and
   wherein the predetermined desired voltage value is adjusted so as to track a time-dependent absolute value of an output voltage set by the secondary circuit.

4. A converter, comprising:
   at least one converter module which comprises a primary circuit connected to a power supply, a secondary circuit connected to a load, a DC link circuit connected between the primary circuit and the secondary circuit, and an intermediate circuit capacitance connected in the DC link circuit, and
   a control device controlling the primary circuit such that an intermediate circuit voltage dropping across the intermediate circuit capacitance has a predetermined desired voltage value, wherein the predetermined desired voltage value is variable depending on a direction of a power flow in the secondary circuit,
   wherein, when the power flow in the secondary circuit corresponds substantially to a motor operation of the load, the predetermined desired voltage value is reduced in advance of a power flow in the secondary circuit that corresponds to a generator operation of the load,
   wherein, when the power flow in the secondary circuit corresponds substantially to a generator operation of the load, the predetermined desired voltage value is increased so as to exactly or at least approximately correspond to a permissible maximum value for the intermediate circuit voltage, and wherein the desired voltage value is modified based on a common correction term such that a total power of the converter module is controlled to a predetermined desired total power value, and wherein the predetermined desired voltage value is adjusted so as to track a time-dependent absolute value of an output voltage set by the secondary circuit.

5. A converter, comprising:

a plurality of converter modules, each of the converter modules comprising a primary circuit configured to be connected to a power supply, a secondary circuit configured to be connected to a load, a DC link circuit connected between the primary and the secondary circuits, and an intermediate circuit capacitance connected to the DC link circuit, and a control device configured to set a predetermined desired module-specific voltage value individually for each of the converter modules by controlling the respective primary circuit such that an intermediate circuit voltage dropping across the intermediate circuit capacitance has the predetermined desired module-specific voltage value, wherein the predetermined desired module-specific voltage value is variable depending on a direction of a power flow in the respective secondary circuit, wherein, when the power flow in the respective secondary circuit corresponds substantially to a motor operation of the load, the predetermined desired voltage value is reduced in advance of a power flow in the secondary circuit that corresponds to a generator operation of the load, or wherein, when the power flow in the respective secondary circuit corresponds substantially to a generator operation of the load, the predetermined desired voltage value is increased so as to exactly or at least approximately correspond to a permissible maximum value for the intermediate circuit voltage, and wherein the predetermined desired voltage value is adjusted so as to track a time-dependent absolute value of an output voltage set by the secondary circuit.

* * * * *